US011792145B2

(12) United States Patent
Lapic et al.

(10) Patent No.: US 11,792,145 B2
(45) Date of Patent: Oct. 17, 2023

(54) PORTABLE DOCUMENT FILE COMMUNICATION SYSTEM

(71) Applicant: ZIPWHIP, LLC, San Francisco, CA (US)

(72) Inventors: James Lapic, Kirkland, WA (US); Alan Capps, Monroe, WA (US)

(73) Assignee: Zipwhip, LLC, San Francisco, CA (US)

(*) Notice: Subject to any disclaimer, the term of this patent is extended or adjusted under 35 U.S.C. 154(b) by 398 days.

(21) Appl. No.: 16/364,027

(22) Filed: Mar. 25, 2019

(65) Prior Publication Data
US 2019/0306097 A1  Oct. 3, 2019

Related U.S. Application Data

(60) Provisional application No. 62/650,072, filed on Mar. 29, 2018.

(51) Int. Cl.
*H04L 51/08* (2022.01)
*H04L 51/10* (2022.01)
*G06F 40/117* (2020.01)
*H04L 51/56* (2022.01)
*H04L 51/58* (2022.01)

(52) U.S. Cl.
CPC .......... *H04L 51/08* (2013.01); *G06F 40/117* (2020.01); *H04L 51/10* (2013.01); *H04L 51/56* (2022.05); *H04L 51/58* (2022.05)

(58) Field of Classification Search
CPC ......... H04L 51/08; H04L 51/10; H04L 51/36; H04L 51/38; G06F 40/117
See application file for complete search history.

(56) References Cited

U.S. PATENT DOCUMENTS

| RE47,016 E | * | 8/2018 | Mizrachi | ................. G09G 5/26 |
| 2009/0125802 A1 | * | 5/2009 | Chen | ...................... G06F 40/14 |
| | | | | 715/234 |
| 2016/0048483 A1 | * | 2/2016 | Baldwin | ............. G06F 3/04842 |
| | | | | 715/236 |
| 2017/0351913 A1 | * | 12/2017 | Chen | ................. G06K 9/00442 |
| 2019/0124021 A1 | * | 4/2019 | DeMattei | .............. G06F 3/0488 |
| 2019/0213265 A1 | * | 7/2019 | Boerner | ............... G06F 16/122 |

* cited by examiner

Primary Examiner — William G Trost, IV
Assistant Examiner — Abdelbasst Talioua
(74) Attorney, Agent, or Firm — Lowenstein Sandler LLP

(57) ABSTRACT

A method for operating a portable document file (PDF) communication system involves receiving a composition control through a structured message user interface (UI) on a first device. The method uploads a PDF to a document transformation engine. A PDF analyzer identifies at least one break point within the PDF. A PDF splitter is configured with the at least one break point to generate at least one image from the PDF and transmit the PDF and the at least one image to an archiver. The archiver is operated to store the at least one image and the PDF and generate an archival link. A multimedia message service (MMS) composer is operated to generate a message parcel from the at least one image and the archival link. The structured message user interface is operated to communicate the message parcel as an MMS message to an endpoint.

20 Claims, 8 Drawing Sheets

PORTABLE DOCUMENT FILE COMMUNICATION SYSTEM

CROSS-REFERENCE TO RELATED APPLICATIONS

The patent application claims the benefit of U.S. Provisional Patent Application No. 62/650,072, filed on Mar. 29, 2018, the contents of which are incorporated herein by reference in their entirety.

BACKGROUND

Text messaging has provided a way for people to conveniently interact with one another, carrying on conversations and conducting business using short electronic messages. The text messaging trend that began with T9 (Text on 9 keys), greatly accelerated with the advent of QWERTY keyboard cell phones and even further with touchscreen Smartphones. Traditional person-to-person text messaging channels do not support high-traffic throughput, and do not facilitate high-quality, high-integrity business communications. Current inefficiencies associated with administrating SMS messaging further restrict the ability of users to fully employ SMS messaging in business-to-business B2B and business-to-client B2C paradigms. This is due in part to traditional channels not providing an efficient means of integration with third-party services as well as the difficulty of utilizing SMS communications across disparate devices. This limits the ability of users to integrate, track, and analyze this increasingly vital form of communication. Similarly, the handing of business and personal documentation within the messaging ecosystem is substantially limited.

PDF files are becoming increasingly central to business and personal document creation and management. Despite the near-ubiquity of both this format and smartphones generally, there has been little-to-no confluence of the two. Smartphone-based support for PDFs lags woefully behind that of the personal computer. Applications for accessing these vital documents on smartphones are scatter-shot in their implementation and work with varying degrees of success. Further, the current messaging ecosystem provides no standard way of delivering PDF files over text messaging.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
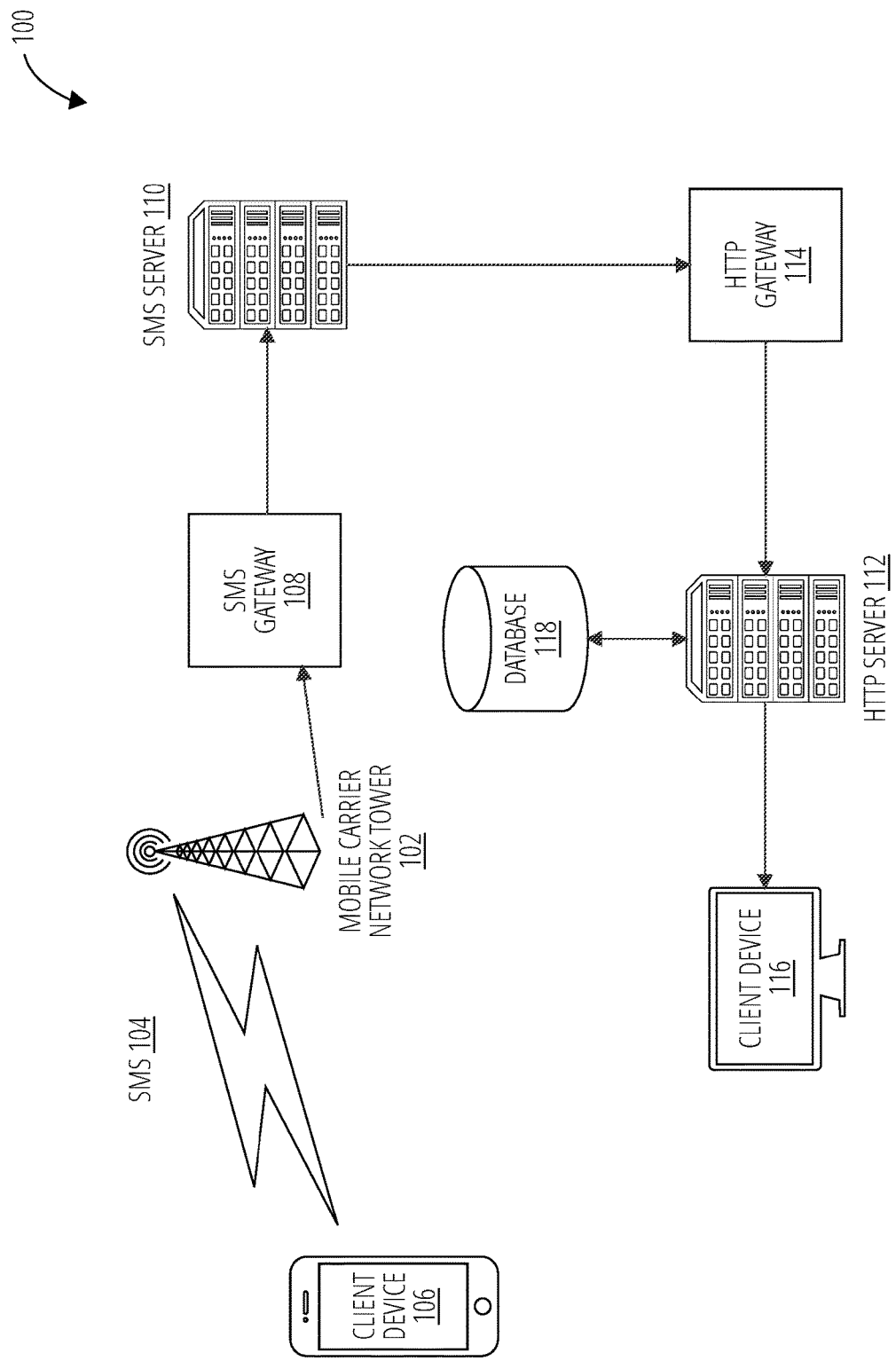
FIG. 1 illustrates an embodiment of a messaging service environment 100.

"Endpoint" refers to client device and/or user interface acting as the recipient of a network resource rendered or utilized by a client device.

"Message parcel" refers to a collection of signals representing associated information, often including logic to define boundaries on what signals are and are not in the message parcel.

"Portable document file uploader" refers to logic or combination of logic for selecting stored data and communicating the stored data to a controlled memory data structure and/or to process. For example, in a GUI, an uploader allows a user to navigate through a file system to select at least one file to be communicated to a remote storage location or external process.

"Archival link" refers to a navigational link from one document to another, or from one portion (or component) of a document to another. Typically, a hyperlink is displayed as a highlighted word or phrase that can be selected by clicking on it using a mouse to jump to the associated document or documented portion.

"Archiver" refers to logic or combination of logic that combines a number of files together into one archive file, or a series of archive files, for easier transportation or storage. File archivers may employ lossless data compression in their archive formats to reduce the size of the archive. For example, a basic archiver takes a list of files and concatenate their contents sequentially into archives. The archive files need to store metadata, at least the names and lengths of the original files, if proper reconstruction is possible. More advanced archivers store additional metadata, such as the original timestamps, file attributes or access control lists.

"Multimedia message service (MMS)" refers to a store and forward messaging service that allows subscribers to exchange multimedia files as messages. MMS supports the transmission of various media types: text, picture, audio, video, or a combination of all four. The originator creates a Multimedia Message, for example by snapping a photo or recording a video with the phone camera, or by using images, videos, and sounds stored previously in the phone (or downloaded from a web site). If the recipient phone is not switched on or it has not been setup to receive MMS messages, the Multimedia Message will be stored in a special repository offered by the carrier. Multimedia Messaging Service is a descendant of SMS (Short Messaging Service). MMS extends text messaging to include longer text, graphics, photos, audio clips, video clips, or any combination of the above, within certain size limits. MMS is frequently used to send photos and videos from camera phones to other MMS phones or email accounts. Most camera phones have MMS, but many non-camera phones have it as well. Many newer MMS phones also support SMIL, which allows various parts of an MMS message to be arranged into a small multimedia "slideshow" to be viewed on another SMIL-capable MMS phone.

"Parser" refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x;

y_pos=gpsCoordinate.y; z_pos=gpsCoordinate.z; Other examples of parsers will be readily apparent to those of skill in the art, without undo experimentation.

A user may drop a PDF into a structured GUI, and the PDF may then be analyzed to determine break points within the PDF that determine where to partition the file into multiple individual pages. The system may then partition the file into multiple pages and convert the pages into an image file format, for example JPEG or PNG. The portable document file analyzer may analyze the PDF files format and embedded markup to determine the pages, or may partition based on page content. For example, the system may analyze the PDF to determine where text and images are located on a given page and then partition the page into smaller images.

The system may return images of the PDF to the user's phone, and may also return an archival link to the original PDF, which may be stored on a server and may together comprise a message parcel. The user may have the option to configure the message parcel to add, remove or re-order images to display and transmit a subset of images comprising a subset of the contents of the original PDF document. The user may make changes to the images themselves, adding their own markup, for example signing or drawing on an image. The system may copy the original PDF and edit the PDF copy to reflect changes made to the image set, the order of the images or the images themselves.

The structured GUI may be a "compose window" which may generate the composition signal by a user interacting with the GUI. The composition signal may be triggered through an upload or attachment link, for example, a button, or may be a "drag-and-drop" interface. The message parcel may be configurable by the user after generation to comprise a subset of data in the message parcel. The contents of the message parcel may be able to be configured to display the contents in different orders.

A method for operating a portable document file communication system involves receiving a composition control through a structured message user interface (UI) on a first device. The method may generate an attachment control to configure a portable document file uploader to upload a portable document file to a document transformation engine. A portable document file analyzer may then be operated to identify at least one break point within the portable document file. A portable document file splitter may then be configured with the at least one break point to generate at least one image from the portable document file and transmit the portable document file and the at least one image to an archiver. The archiver may then be operated to store the at least one image and the portable document file in a controlled memory data structure and generate an archival link. A multimedia message service (MMS) composer may be operated to generate a message parcel from the at least one image and the archival link. The structured message user interface may then be operated to communicate the message parcel as an MMS message to an endpoint.

In some configurations, the composition control is generated in response to receiving the portable document file through the structured message UI.

In some configurations, the at least one break point comprises at least one of a page group markup, an image object mark up, or combinations thereof.

In some configurations, images of the at least one image in the message parcel are configurable through a message parcel configuration UI.

In some configurations, the endpoint is a second device configured to receive the message parcel in the MMS message by way of a mobile carrier network.

In some configurations, the at least one image is configured for transmission as an MMS message.

A non-transitory computer-readable storage medium, the computer-readable storage medium including instructions that when executed by a computer, cause the computer to receive a composition control through a structured message user interface (UI) on a first device. The computer may then generate an attachment control to configure a portable document file uploader to upload a portable document file to a document transformation engine. The computer may operate a portable document file analyzer to identify at least one break point within the portable document file. The computer may then configure a portable document file splitter with the at least one break point to generate at least one image from the portable document file and transmit the portable document file and the at least one image to an archiver. The computer may operate the archiver to store the at least one image and the portable document file in a controlled memory data structure and generate an archival link. The computer may then operate a multimedia message service (MMS) composer to generate a message parcel from the at least one image and the archival link. Afterwards, the computer may operate the structured message user interface to communicate the message parcel as an MMS message to an endpoint.

In some configurations, the composition control is generated in response to receiving the portable document file through the structured message UI.

In some configurations, the at least one break point comprises at least one of a page group markup, an image object mark up, or combinations thereof.

In some configurations, images of the at least one image in the message parcel are configurable through a message parcel configuration UI.

In some configurations, the endpoint is a second device configured to receive the message parcel in the MMS message by way of a mobile carrier network.

In some configurations, the at least one image is configured for transmission as an MMS message.

A computing apparatus, the computing apparatus may include a processor and memory storing instructions that, when executed by the processor, configure the apparatus to receive a composition control through a structured message user interface (UI) on a first device. The apparatus may then generate an attachment control to configure a portable document file uploader to upload a portable document file to a document transformation engine. The apparatus may then operate a portable document file analyzer to identify at least one break point within the portable document file. The apparatus may configure a portable document file splitter with the at least one break point to generate at least one image from the portable document file and transmit the portable document file and the at least one image to an archiver. The apparatus may then operate the archiver to store the at least one image and the portable document file in a controlled memory data structure and generate an archival link. The apparatus may then operate a multimedia message service (MMS) composer to generate a message parcel from the at least one image and the archival link. The apparatus may then operate the structured message user interface to communicate the message parcel as an MMS message to an endpoint.

In some configurations, the composition control is generated in response to receiving the portable document file through the structured message UI.

In some configurations, the at least one break point comprises at least one of a page group markup, an image object mark up, or combinations thereof.

In some configurations, images of the at least one image in the message parcel are configurable through a message parcel configuration UI.

In some configurations, the endpoint is a second device configured to receive the message parcel in the MMS message by way of a mobile carrier network.

In some configurations, the at least one image is configured for transmission as an MMS message.

FIG. 1 illustrates an embodiment of a messaging service environment 100. The messaging service environment 100 comprises a mobile carrier network tower 102, an SMS 104, a client device 106, an SMS gateway 108, an SMS server 110, an http server 112, an http gateway 114, a client device 116, and a database 118. The client device 106 transmits the SMS 104 to the mobile carrier network tower 102. The SMS server 110 receives the SMS 104 from the mobile carrier network tower 102 via the SMS gateway 108. The http server 112 receives the SMS 104 via the http gateway 114 and transmits the SMS 104 to the client device 116 and the database 118.

Figure 2:
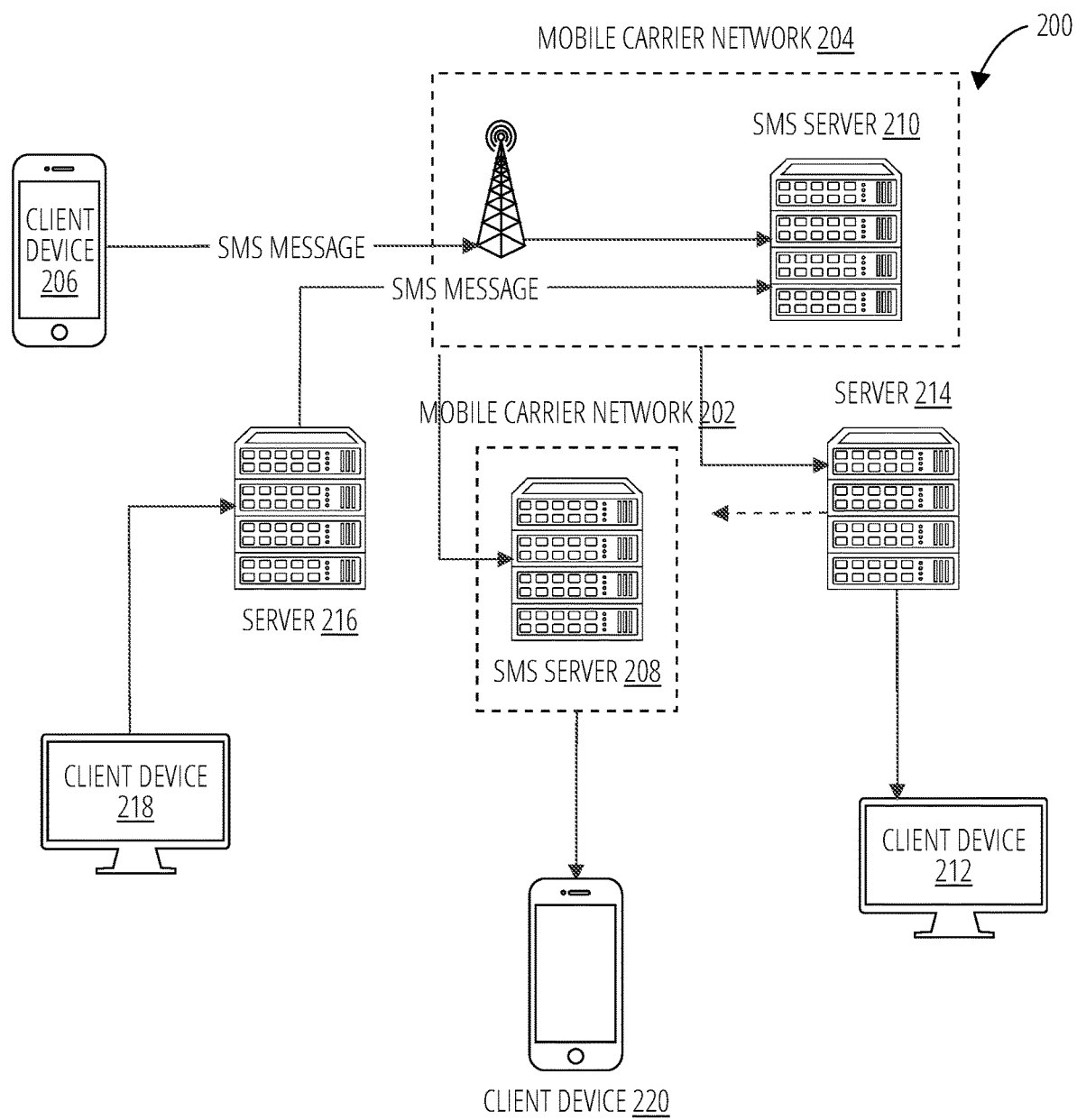
FIG. 2 illustrates an embodiment of a messaging service environment 200.

FIG. 2 illustrates a messaging service environment 200 in accordance with one embodiment. The messaging service environment 200 comprises a mobile carrier network 202, a mobile carrier network 204, a client device 206, a client device 220, an SMS server 208, an SMS server 210, a client device 212, a server 214, and a client device 218. The client device 206 transmits an SMS message to the SMS server 210 via the mobile carrier network 204. The SMS server 210 transmits the SMS message to the server 214. The server 214 transmits the SMS message to the client device 212. The client device 218 transmits an SMS message to the server 216, which transmits the SMS message to the SMS server 210 via the mobile carrier network 204. The SMS server 210 transmits the SMS message to the SMS server 208 via the mobile carrier network 202. The SMS server 208 transmits the SMS message to the client device 220.

Figure 3:
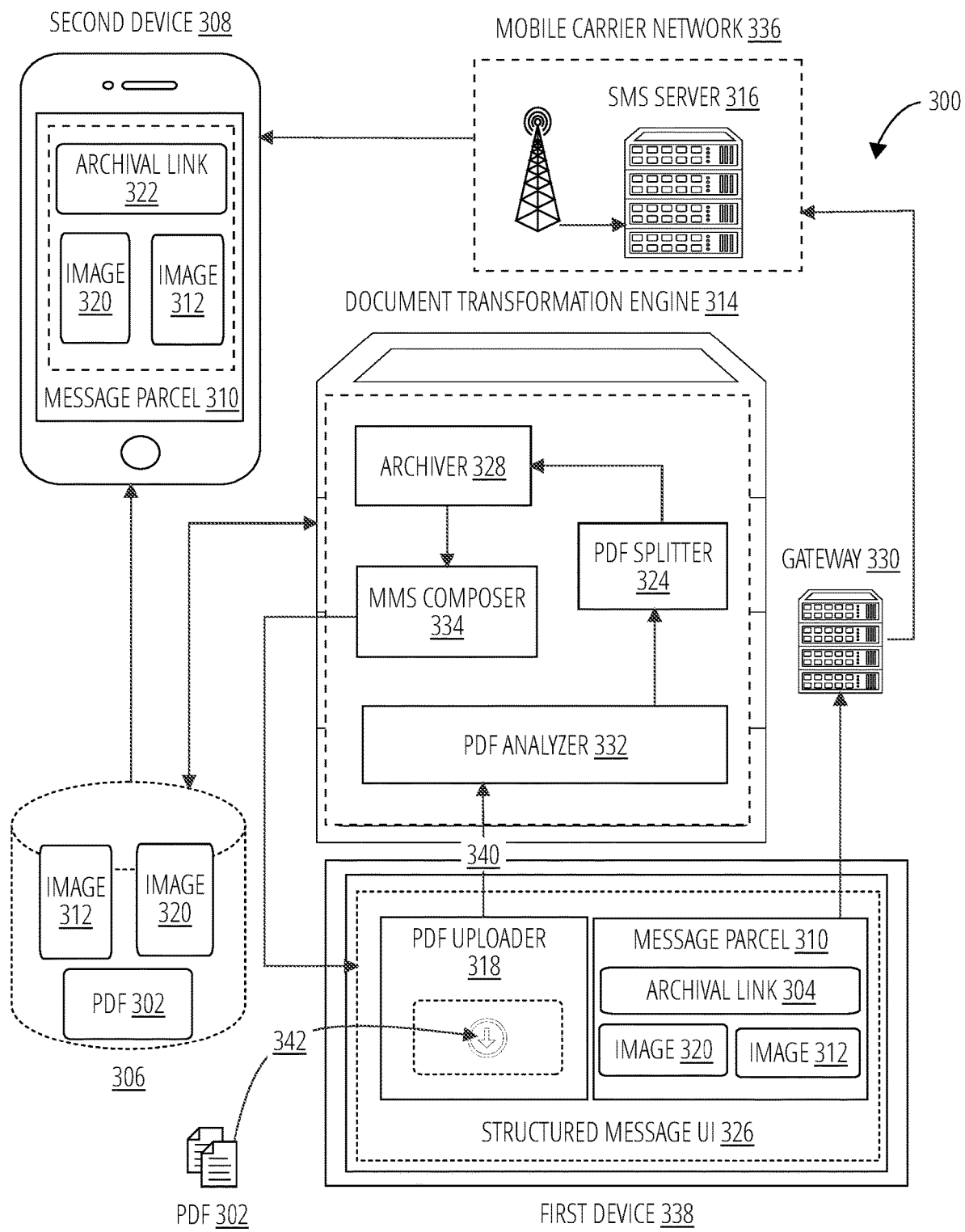
FIG. 3 illustrates an embodiment of a PDF communication system 300.

FIG. 3 illustrates a PDF communication system 300 for communicating a message parcel 310 from a first device 338 to an endpoint (second device 308). The PDF communication system 300 comprises a first device 338, a document transformation engine 314, and a second device 308. The first device 338 comprises a structured message user interface 326 that receives a composition control 342 with a portable document file 302. A portable document file uploader 318 communicates the portable document file 302 to a portable document file analyzer 332 of the document transformation engine 314 in response to an attachment control 340. The portable document file analyzer 332 identifies at least one break point in the portable document file 302 and communicates the portable document file 302 and the at least one break point to a portable document file splitter 324. The portable document file splitter 324 generates at least one image from the portable document file 302 as configured by the at least one break point. The at least one image (image 312 and image 320) and the portable document file 302 are then communicated to an archiver 328 which stores the image 312 and the image 320 to a controlled memory data structure 306 along with the portable document file 302. The archiver 328 generates an archival link 304 for the location of the portable document file 302 in the controlled memory data structure 306 and communicates the image 312, the image 320, and the archival link 304 to an MMS composer 334. The MMS composer 334 generates a message parcel 310 from the archival link 304, the image 320, and the image 312. The MMS composer 334 communicates the message parcel 310 to the structured message user interface 326 on the first device 338. The message parcel 310 is configured as an MMS message by the MMS composer 334 and communicated to a second device 308 by way of a gateway 330 and a mobile carrier network 336 comprising an SMS server 316. The contents of the message parcel 310 are displayed on the second device 308. The second device 308 may also retrieve the portable document file 302 from the controlled memory data structure 306 by opening the archival link 322.

Figure 4:
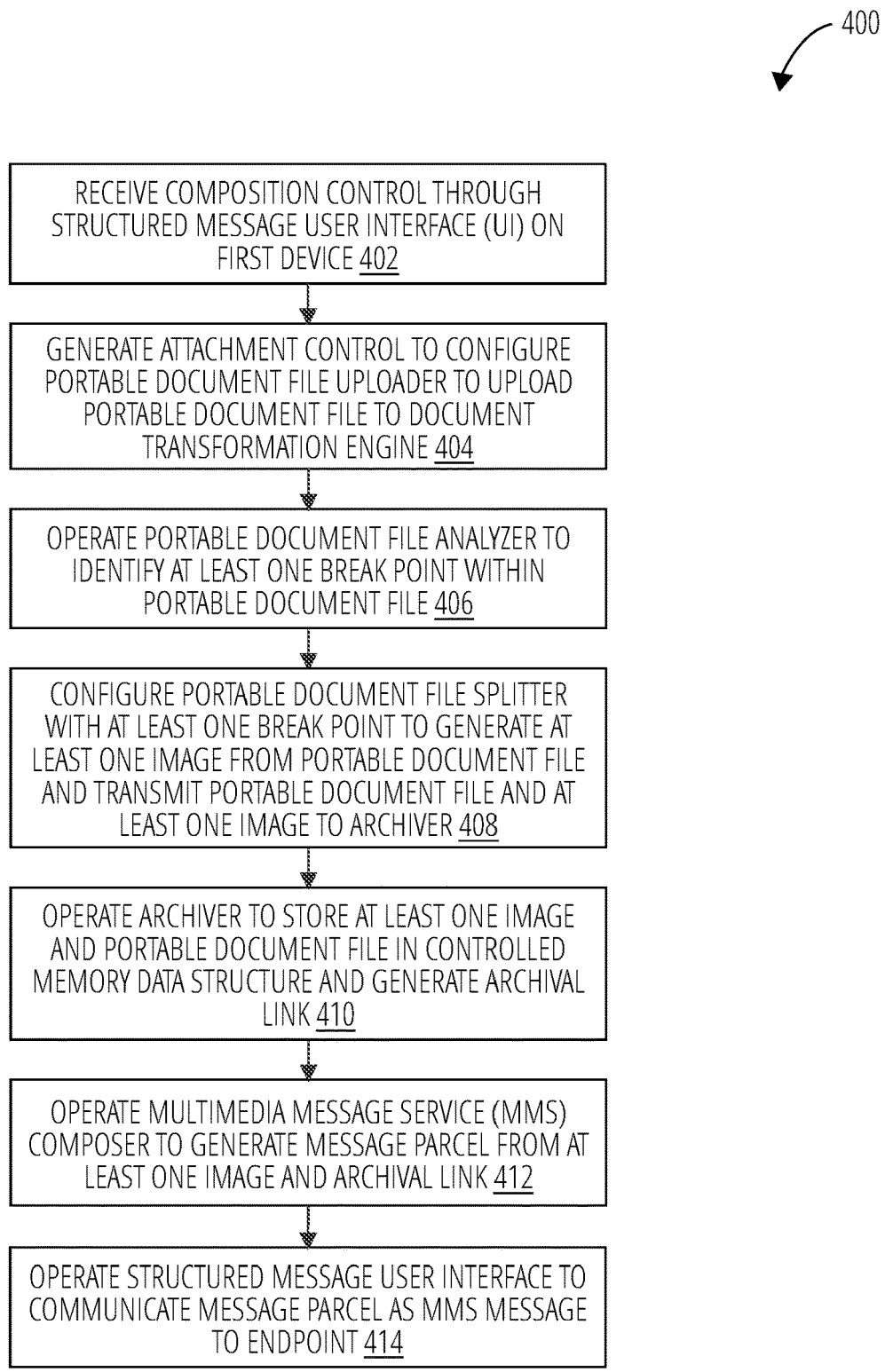
FIG. 4 illustrates a routine for operating a portable document file communication system in accordance with one embodiment.

The PDF communication system 300 may be operated with the process outlined in FIG. 4.

In FIG. 4, a method 400 for operating a PDF communication system involves receiving a composition control through a structured message user interface (UI) on a first device (block 402). In block 404, the method 400 generates an attachment control to configure a portable document file uploader to upload a portable document file to a document transformation engine. In block 406, the method 400 operates a portable document file analyzer to identify at least one break point within the portable document file. In block 408, the method 400 configures a portable document file splitter with the at least one break point to generate at least one image from the portable document file and transmit the portable document file and the at least one image to an archiver. In block 410, the method 400 operates the archiver to store the at least one image and the portable document file in a controlled memory data structure and generate an archival link. In block 412, the method 400 operates a multimedia message service (MMS) composer to generate a message parcel from the at least one image and the archival link. In block 414, the method 400 operates the structured message user interface to communicate the message parcel as an MMS message to an endpoint.

Figure 5:
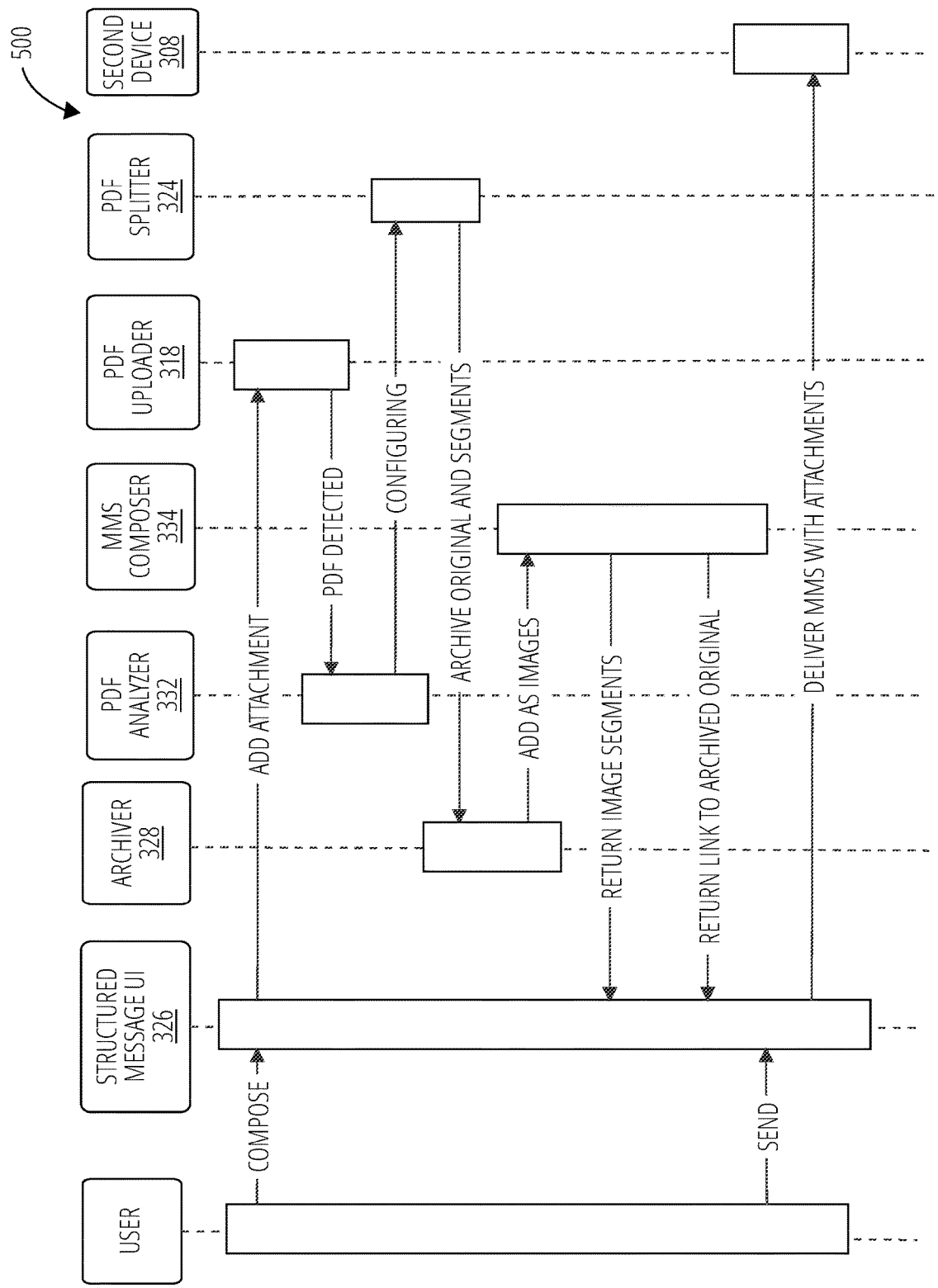
FIG. 5 illustrates an embodiment of a sequence diagram 500.

FIG. 5 illustrates a sequence diagram 500 for the operation of the PDF communication system 300.

In the sequence diagram 500, the structured message user interface 326 receives a composition control, which may be a portable document file 302 and generates an attachment control to configure the portable document file uploader 318 to upload the portable document file 302 to the document transformation engine. The portable document file analyzer 332 detects that a portable document file 302 has been uploaded and analyzes the portable document file 302 to extract at least one break point. the at least one break point configures the portable document file splitter 324 to generate image segments from the portable document file 302 in the form of an at least one image (image 312 and image 320). The portable document file splitter 324 then communicates the original unmodified version of the portable document file 302 and image 312 and image 320, to the archiver 328. The archiver 328 stores the image 320, the image 312 and the portable document file 302 in the controlled memory data structure 306 and generates an archival link 322 for accessing the stored images and the portable document file 302. The MMS composer 334 generates a message parcel 310 from the archival link 322, the image 312, and the image 320 received from the archiver 328. The structured message user interface 326 configures the message parcel 310 to transmit as an MMS message to an endpoint (second device 308) by way of the gateway 330, the SMS server 316 and the mobile carrier network 336.

Figure 6:
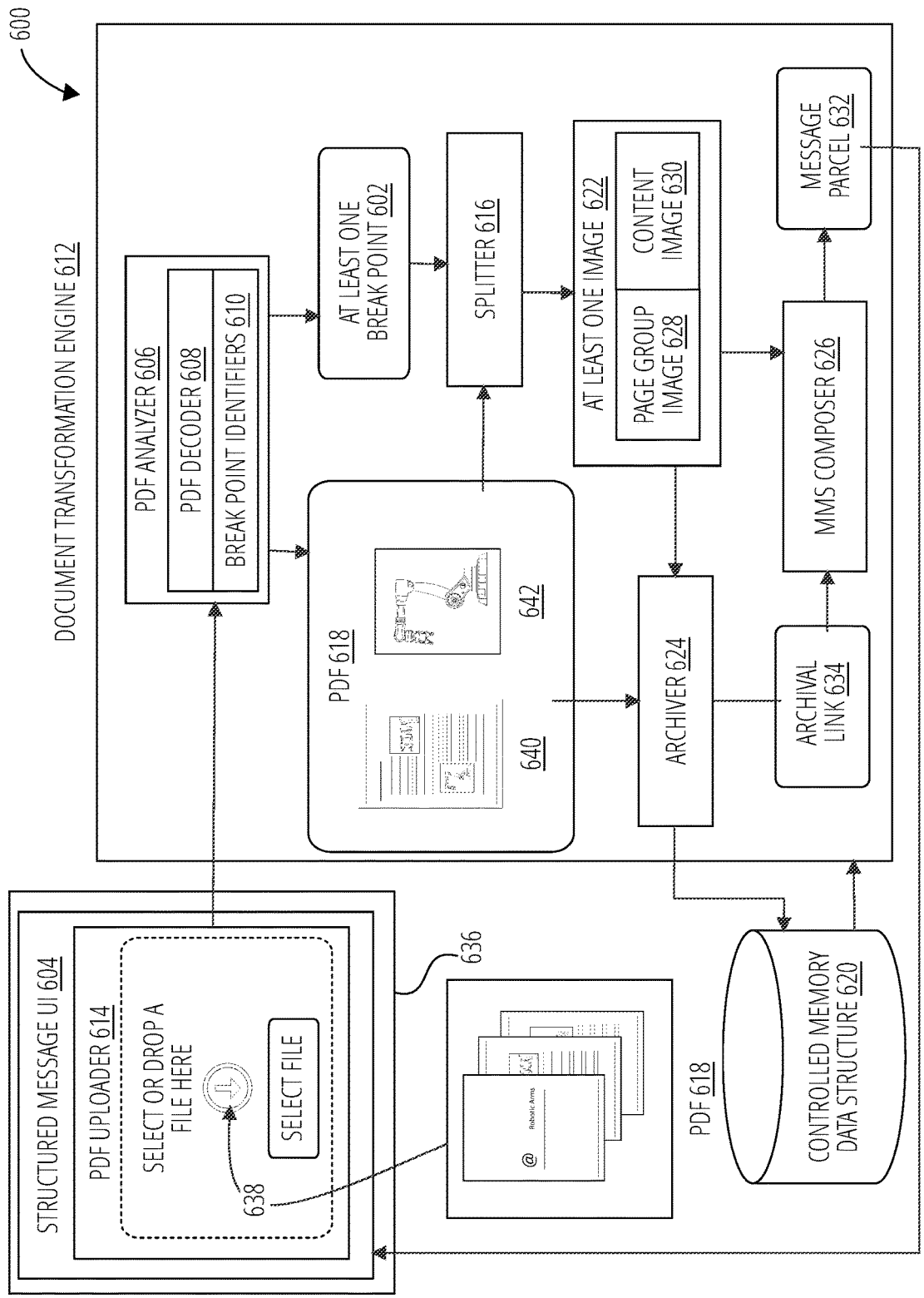
FIG. 6 illustrates a portable document file communication system 600 in accordance with one embodiment.

FIG. 6 illustrates an embodiment of a portable document file communication system 600. The system 600 comprises a first device 636 displaying a structured message user interface 604. The structured message user interface 604 receives a portable document file 618 from a user through a drag and drop interaction 638. The user may also open a file explorer and select the portable document file from an accessible storage location. The portable document file uploader 614 communicates the portable document file 618 to a PDF analyzer 606 with the document transformation engine 612. The PDF analyzer 606 operates as a parser and identifies at least one break point 602 within the portable document file 618. The PDF analyzer 606 may comprise a PDF decoder 608 and break point identifiers 610. The PDF decoder 608 may be a hex decoder, a PDF reader, or a combination thereof that allows the PDF analyzer 606 to view mark up language of the portable document file 618 and or the constructed version of the portable document file 618 to identify break points. The break point identifiers 610 may be mark up language corresponding to pages and/or content in the portable document file 618, for instance such as mark up language corresponding to a page group, and image objects. The break point identifiers 610 may also be a set of parameters corresponding to the display of the constructed portable document file 618. The PDF analyzer 606 generates at least one break point 602 from the portable document file 618. The at least one break point 602 may identify at least one of a page group 640 or an image object 642 within the portable document file 618. The PDF analyzer 606 communicates the at least one break point 602 and the portable document file 618 to the portable document file splitter 616. The portable document file splitter 616 utilizes the at least one break point 602 to generate at least one image 622 in the form of segments or extracted image content from the portable document file 618. The at least one image 622 may comprise a page group image 628 and an image content object 630 from the page group 640 and the image object 642 respectively. The at least one image 622 and the portable document file 618 are then communicated to the archiver 624 to store in a controlled memory data structure 620. The archiver 624 communicates an archival link 634 to the MMS composer 626 corresponding to the storage location of the at least one image 622 and the portable document file 618 in the controlled memory data structure 620. The MMS composer 626 generates a message parcel 632 from the at least one image 622 and the archival link 634 which is then communicated to the structured message user interface 604.

The components of a portable document file (PDF) comprise syntax corresponding to objects, file structure, document structure, and content stream.

Within a PDF document is a data structure comprising a small set of basic types of data objects. The PDF file structure determines how objects are stored in a PDF file, how they are accessed, and how they are updated. This structure is independent of the semantics of the objects. The PDF document structure specifies how the basic object types are used to represent components of a PDF document: pages, fonts, annotations, and so forth.

A PDF content stream comprises a sequence of instructions describing the appearance of a page or other graphical entity. These instructions, while also represented as objects, are conceptually distinct from the objects that represent the document structure and are described separately.

At the most fundamental level, a PDF file is a sequence of bytes. These bytes can be grouped into tokens according to the syntax rules described in this sub-clause. One or more tokens are assembled to form higher level syntactic entities, principally objects, which are the basic data values from which a PDF document is constructed.

A non-encrypted PDF can be entirely represented using byte values corresponding to the visible printable subset of the character set defined in ANSI X3.4-1986, plus white space characters. However, a PDF file is not restricted to the ASCII character set; it may contain arbitrary bytes, subject to the following considerations:

- The tokens that delimit objects and that describe the structure of a PDF file shall use the ASCII character set. In addition, all the reserved words and the names used as keys in PDF standard dictionaries and certain types of arrays shall be defined using the ASCII character set.
- The data values of strings and streams objects may be written either entirely using the ASCII character set or entirely in binary data. In actual practice, data that is naturally binary, such as sampled images, is usually represented in binary for compactness and efficiency.
- A PDF file containing binary data shall be transported as a binary file rather than as a text file to insure that all bytes of the file are faithfully preserved.
- File structure. The PDF file structure determines how objects are stored in a PDF file, how they are accessed, and how they are updated. This structure is independent of the semantics of the objects.

The PDF document structure specifies how the basic object types are used to represent components of a PDF document: pages, fonts, annotations, and so forth. A PDF document can be regarded as a hierarchy of objects contained in the body section of a PDF file. At the root of the hierarchy is the document's catalog dictionary. The root of a document's object hierarchy is the catalog dictionary, located by means of the Root entry in the trailer of the PDF. The catalog contains references to other objects defining the document's contents, outline, article threads, named destinations, and other attributes. In addition, it contains information about how the document shall be displayed on the screen, such as whether its outline and thumbnail page images shall be displayed automatically and whether some location other than the first page shall be shown when the document is opened.

A Page Group within a PDF correspond to document level mark up signifying the presentation of all elements corresponding to a page in both top-level groups and top-level objects that are not part of any group. This grouping of object is referred to as the page group. The page group may be treated in one of two distinctly different ways.

Ordinarily, the page shall be imposed directly on an output medium, such as paper or a display screen. The page group shall be treated as an isolated group, whose results shall then be composited with a backdrop color appropriate for the medium. The backdrop may be nominally white, although varying according to the actual properties of the medium. However, some conforming readers may choose to provide a different backdrop, such as a checker board or grid to aid in visualizing the effects of transparency in the artwork.

Another way that a page group may be treated is by treating a "page" of a PDF file a graphics object to be used as an element of a page of some other document.

A PDF content stream contains a sequence of instructions describing the appearance of a page or other graphical entity. These instructions, while also represented as objects, are conceptually distinct from the objects that represent the document structure and are described separately.

Content streams are the primary means for describing the appearance of pages and other graphical elements. A content stream depends on information contained in an associated resource dictionary; in combination, these two objects form a self-contained entity.

A content stream is a PDF stream object whose data includes of a sequence of instructions describing the graphical elements to be painted on a page. The instructions shall be represented in the form of PDF objects, using the same object syntax as in the rest of the PDF document. However, whereas the document as a whole is a static, random-access data structure, the objects in the content stream shall be interpreted and acted upon sequentially.

Each page of a document shall be represented by one or more content streams. Content streams shall also be used to package sequences of instructions as self-contained graphical elements, such as forms, patterns, certain fonts, and annotation appearances.

A content stream, after decoding with any specified filters, shall be interpreted according to the PDF syntax rules. This may comprise PDF objects denoting operands and operators. The operands needed by an operator shall precede it in the stream.

An operand is a direct object belonging to any of the basic PDF data types except a stream. Dictionaries shall be permitted as operands only by certain specific operators. Indirect objects and object references shall not be permitted at all.

The data in a content stream shall be interpreted as a sequence of operators and their operands, expressed as basic data objects according to standard PDF syntax. A content stream can describe the appearance of a page, or it can be treated as a graphical element in certain other contexts.

The operands and operators shall be written sequentially using postfix notation. Although this notation resembles the sequential execution model of the PostScript language, a PDF content stream is not a program to be interpreted; rather, it is a static description of a sequence of graphics objects. There are specific rules, described below, for writing the operands and operators that describe a graphics object.

A PDF provides five types of graphics objects: a path object, a text object, an external object, an inline object, and a shading object.

A path object is an arbitrary shape made up of straight lines, rectangles, and cubic Bezier curves. A path may intersect itself and may have disconnected sections and holes. A path object ends with one or more painting operators that specify whether the path shall be stroked, filled, used as a clipping boundary, or some combination of these operations.

A text object includes of one or more character strings that identify sequences of glyphs to be painted. Like a path, text can be stroked, filled, or used as a clipping boundary.

An external object (XObject) is an object defined outside the content stream and referenced as a named resource "Resource Dictionaries". The interpretation of an XObject depends on its type. An image XObject defines a rectangular array of color samples to be painted; a form XObject is an entire content stream to be treated as a single graphics object. Specialized types of form XObjects shall be used to import content from one PDF file into another and to group graphical elements together as a unit for various purposes (group XObjects). In particular, the latter are used to define transparency groups for use in the transparent imaging model. There is also a PostScript XObject that may appear in some existing PDF files.

An inline image object uses a special syntax to express the data for a small image directly within the content stream.

A shading object describes a geometric shape whose color is an arbitrary function of position within the shape. (A shading can also be treated as a color when painting other graphics objects; it is not considered to be a separate graphics object in that case.)

An image is defined by a sequence of samples obtained by scanning the image array in row or column order. Each sample in the array includes of as many color components as are needed for the color space in which they are specified—for example, one component for DeviceGray, three for DeviceRGB, four for DeviceCMYK, or whatever number is required by a particular DeviceN space.

A PDF's painting operators include general facilities for dealing with sampled images. A sampled image (or just image for short) is a rectangular array of sample values, each representing a color. The image may approximate the appearance of some natural scene obtained through an input scanner or a video camera, or it may be generated synthetically.

A PDF provides two means for specifying images as an external object or as an inline object.

An image XObject is a stream object whose dictionary specifies attributes of the image and whose data contains the image samples. Like all external objects, it is painted on the page by invoking the Do operator in a content stream "External Objects". Image XObjects have other uses as well, such as for alternate images "Alternate Images", image masks, and thumbnail images. In inline image is a small image that is completely defined—both attributes and data—directly inline within a content stream. The kinds of images that can be represented in this way are limited;

The properties of an image such as resolution, orientation, scanning order, and so forth, are entirely independent of the characteristics of the raster output device on which the image is to be rendered. A conforming reader usually renders images by a sampling technique that attempts to approximate the color values of the source as accurately as possible. The actual accuracy achieved depends on the resolution and other properties of the output device.

Figure 7:
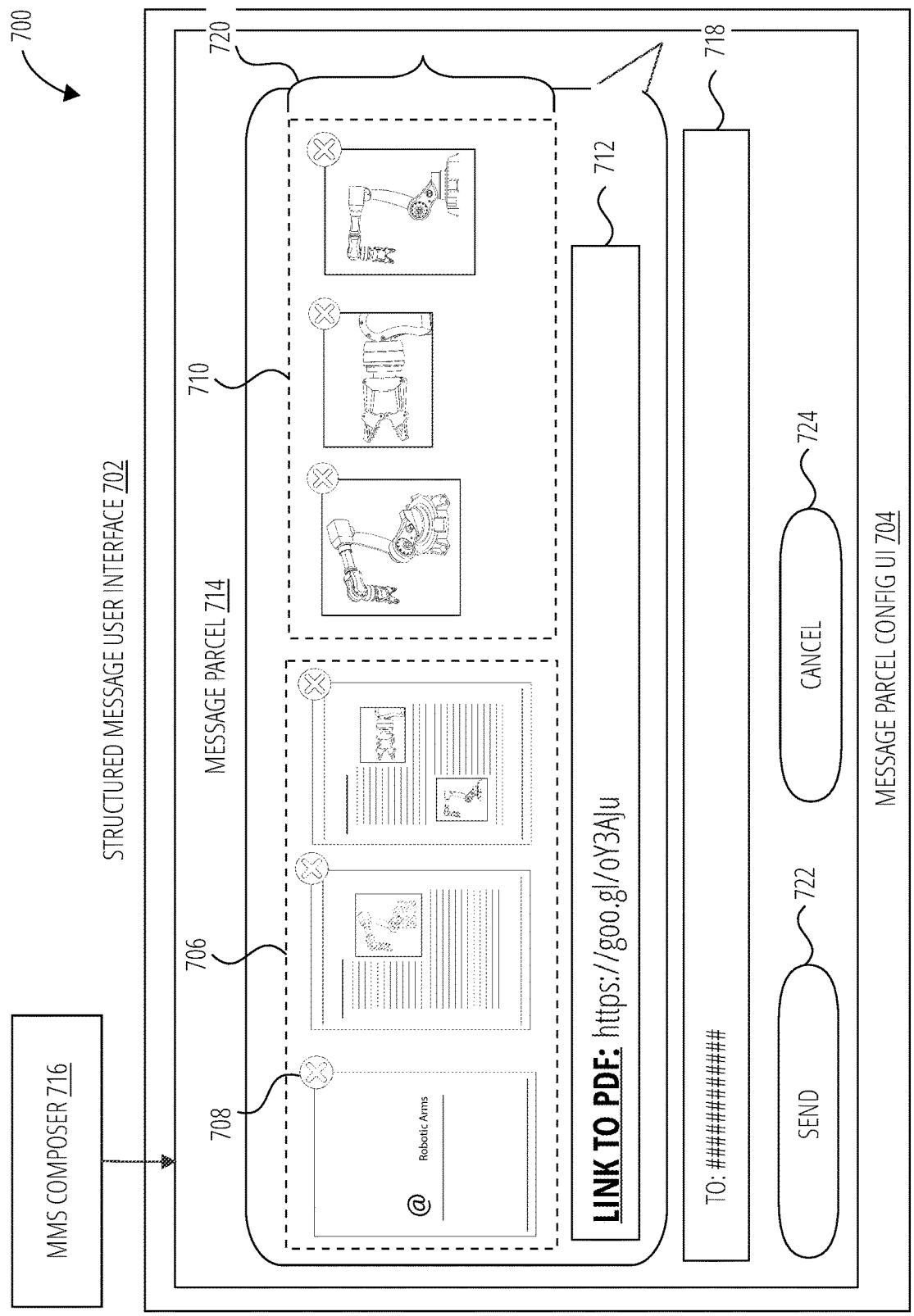
FIG. 7 illustrates a user interface 700 in accordance with one embodiment.

FIG. 7 illustrates an embodiment of a user interface 700 comprising the structured message user interface 702 after receiving the message parcel 714 from the MMS composer 716. In the user interface 700 the message parcel 714 is configurable through a message parcel configuration UI 704 in the structured message user interface 702. The message parcel 714 comprises the at least one image 720 and an archival link 712. The at least one image 720 may include page images 706 and content object images 710 from the portable document file. The individual images of the content object images 710 and the page images 706 may be rearranged or removed from message parcel 714 as desired by the user. A user may remove unwanted images from the message parcel 714 by selecting a deselector 708. The message parcel configuration UI 704 additionally includes an input field for adding a destination address 718 for a recipient. The destination address 718 may include a recipient's phone number, carrier network address, etc. When the user completes configuring the message parcel 714, the may send the message parcel 714 by hitting the send button 722. Alternatively, the user may cancel the message parcel 714 by hitting the cancel button 724.

Figure 8:
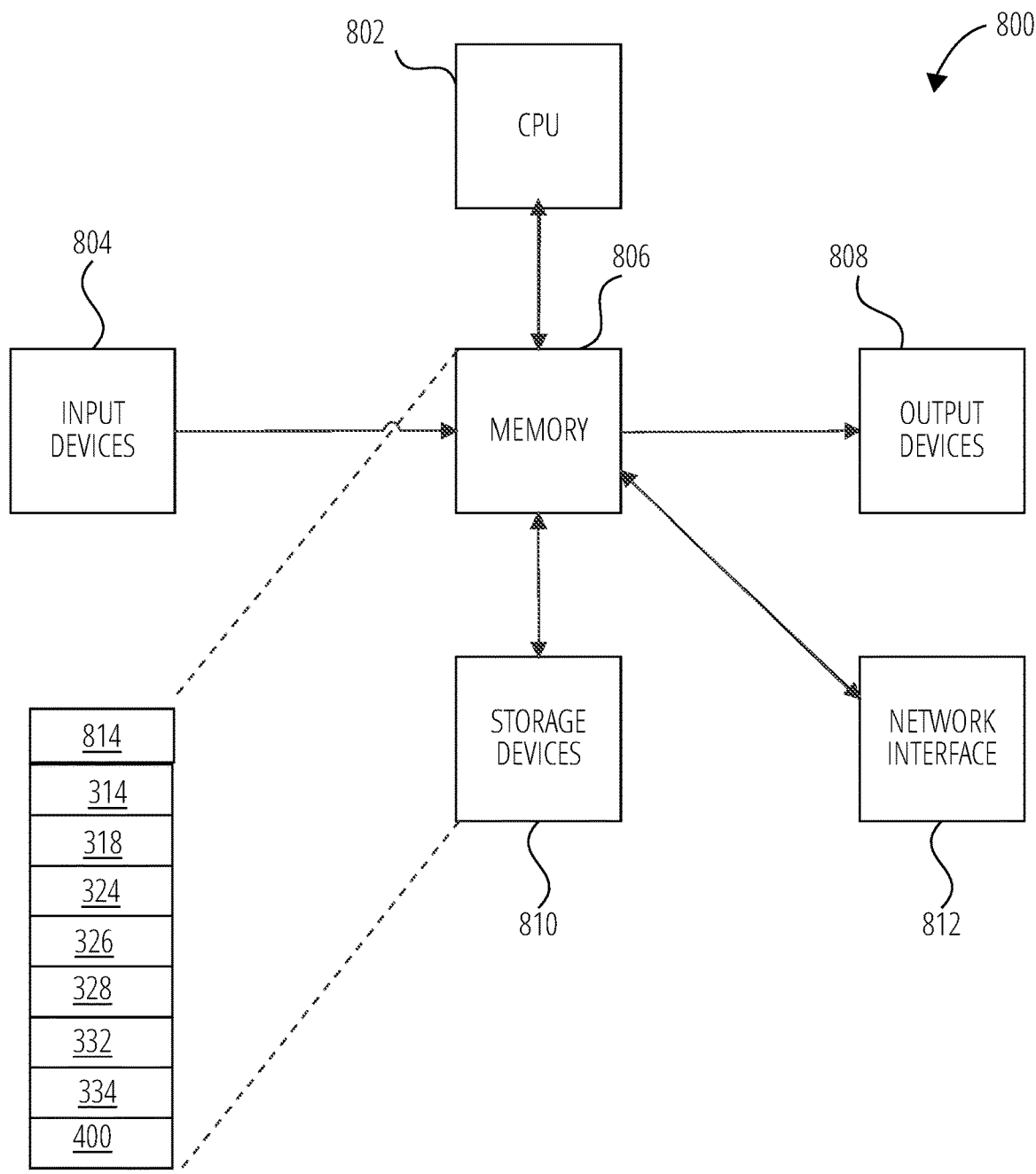
FIG. 8 illustrates an embodiment of a digital apparatus 800 to implement components and process steps of the system described herein.

FIG. 8 illustrates an embodiment of a digital apparatus 800 to implement components and process steps of the system described herein.

Input devices 804 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 804 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 804 are provided via various machine signal conductors (e.g., busses or network interfaces) and circuits to memory 806.

The memory 806 is typically what is known as a first or second level memory device, providing for storage (via configuration of matter or states of matter) of signals received from the input devices 804, instructions and information for controlling operation of the CPU 802, and signals from storage devices 810.

The memory 806 and/or the storage devices 810 may store computer-executable instructions and thus forming logic 814 that when applied to and executed by the CPU 802 implement embodiments of the processes disclosed herein. In some embodiments, memory 806 and the storage devices 810 may include logic corresponding to the document transformation engine 314, the portable document file uploader 318, the portable document file splitter 324, the structured message user interface 326, the archiver 328, the portable document file analyzer 332, the MMS composer 334, and the method 400.

Information stored in the memory 806 is typically directly accessible to the CPU 802 of the device. Signals input to the device cause the reconfiguration of the internal material/energy state of the memory 806, creating in essence a new machine configuration, influencing the behavior of the digital apparatus 800 by affecting the behavior of the CPU 802 with control signals (instructions) and data provided in conjunction with the control signals.

Second or third level storage devices 810 may provide a slower but higher capacity machine memory capability. Examples of storage devices 810 are hard disks, optical disks, large capacity flash memories or other non-volatile memory technologies, and magnetic memories.

The CPU 802 may cause the configuration of the memory 806 to be altered by signals in storage devices 810. In other words, the CPU 802 may cause data and instructions to be read from storage devices 810 in the memory 806 from which may then influence the operations of CPU 802 as instructions and data signals, and from which it may also be provided to the output devices 808. The CPU 802 may alter the content of the memory 806 by signaling to a machine interface of memory 806 to alter the internal configuration, and then converted signals to the storage devices 810 to alter its material internal configuration. In other words, data and instructions may be backed up from memory 806, which is often volatile, to storage devices 810, which are often non-volatile.

Output devices 808 are transducers which convert signals received from the memory 806 into physical phenomenon such as vibrations in the air, or patterns of light on a machine display, or vibrations (i.e., haptic devices) or patterns of ink or other materials (i.e., printers and 3-D printers).

The network interface 812 receives signals from the memory 806 and converts them into electrical, optical, or wireless signals to other machines, typically via a machine network. The network interface 812 also receives signals from the machine network and converts them into electrical, optical, or wireless signals to the memory 806.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be affected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, a wireless device or any other computing device capable of being configured to carry out the methods described herein.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

What is claimed is:

1. A method for operating a portable document file communication system, the method comprising:
   receiving a composition control through a structured message user interface (UI) on a first device;
   generating an attachment control to configure a portable document file uploader to upload a portable document file to a document transformation engine;
   operating a portable document file analyzer to identify at least one break point within the portable document file, wherein the portable document file analyzer comprises a portable document file decoder and break point identifiers,
      the portable document file decoder comprising one or more of a hex decoder and a portable document file reader,
      the break point identifiers comprising mark up language corresponding to one or more of pages in the portable document file, content in the portable document file, and a set of parameters corresponding to a display of the portable document file;
   configuring a portable document file splitter with the at least one break point to generate at least one image from the portable document file and transmit the portable document file and the at least one image to an archiver, wherein the archiver is located outside of the first device;
   operating the archiver to store the at least one image and the portable document file in a controlled memory data structure and generate an archival link, wherein the controlled memory data structure is located outside of the first device;
   operating a multimedia message service (MMS) composer to generate a message parcel from the at least one image and the archival link; and
   operating the structured message user interface to communicate the message parcel as an MMS message to an endpoint.

2. The method of claim 1, wherein the composition control is generated in response to receiving the portable document file through the structured message UI.

3. The method of claim 1, wherein the at least one break point comprises at least one or more of a page group markup and an image object mark up.

4. The method of claim 1, wherein images of the at least one image in the message parcel are configurable through a message parcel configuration UI.

5. The method of claim 1, wherein, the endpoint is a second device configured to receive the message parcel in the MMS message by way of a mobile carrier network.

6. The method of claim 1, wherein the at least one image is configured for transmission as the MMS message.

7. A non-transitory computer-readable storage medium, the computer- readable storage medium including instructions that when executed by a computer, cause the computer to:
   receive a composition control through a structured message user interface (UI) on a first device;
   generate an attachment control to configure a portable document file uploader to upload a portable document file to a document transformation engine;
   operate a portable document file analyzer to identify at least one break point within the portable document file, wherein the portable document file analyzer comprises a portable document file decoder and break point identifiers,
      the portable document file decoder comprising one or more of a hex decoder, a portable document file reader,
      the break point identifiers comprising mark up language corresponding to one or more of pages in the portable document file, content in the portable document file, and a set of parameters corresponding to a display of the portable document file;
   configure a portable document file splitter with the at least one break point to generate at least one image from the portable document file and transmit the portable document file and the at least one image to an archiver, wherein the archiver is located outside of the first device;
   operate the archiver to store the at least one image and the portable document file in a controlled memory data structure and generate an archival link, wherein the controlled memory data structure is located outside of the first device;

operate a multimedia message service (MMS) composer to generate a message parcel from the at least one image and the archival link; and operate the structured message user interface to communicate the message parcel as an MMS message to an endpoint.

8. The computer-readable storage medium of claim 7, wherein the composition control is generated in response to receiving the portable document file through the structured message UI.

9. The computer-readable storage medium of claim 7, wherein the at least one break point comprises at least one or more of a page group markup and an image object mark up.

10. The computer-readable storage medium of claim 7, wherein images of the at least one image in the message parcel are configurable through a message parcel configuration UI.

11. The computer-readable storage medium of claim 7, wherein the endpoint is a second device configured to receive the message parcel in the MMS message by way of a mobile carrier network.

12. The computer-readable storage medium of claim 7, wherein the at least one image is configured for transmission as the MMS message.

13. A computing apparatus, the computing apparatus comprising:

a processor; and a memory storing instructions that, when executed by the processor, configure the apparatus to:

receive a composition control through a structured message user interface (UI) on a first device;

generate an attachment control to configure a portable document file uploader to upload a portable document file to a document transformation engine;

operate a portable document file analyzer to identify at least one break point within the portable document file, wherein the portable document file analyzer comprises a portable document file decoder and break point identifiers, the portable document file decoder comprising one or more of a hex decoder, a portable document file reader, the break point identifiers comprising mark up language corresponding to one or more of pages in the portable document file, content in the portable document file, and a set of parameters corresponding to a display of the portable document file;

configure a portable document file splitter with the at least one break point to generate at least one image from the portable document file and transmit the portable document file and the at least one image to an archiver, wherein the archiver located outside of the first device;

operate the archiver to store the at least one image and the portable document file in a controlled memory data structure and generate an archival link, wherein the controlled memory data structure located outside of the first device;

operate a multimedia message service (MMS) composer to generate a message parcel from the at least one image and the archival link; and operate the structured message user interface to communicate the message parcel as an MMS message to an endpoint.

14. The computing apparatus of claim 13, wherein the composition control is generated in response to receiving the portable document file through the structured message UI.

15. The computing apparatus of claim 13, wherein the at least one break point comprises at least one or more of a page group markup and an image object mark up.

16. The computing apparatus of claim 13, wherein images of the at least one image in the message parcel are configurable through a message parcel configuration UI.

17. The computing apparatus of claim 13, wherein the endpoint is a second device configured to receive the message parcel in the MMS message by way of a mobile carrier network.

18. The computing apparatus of claim 13, wherein the at least one image is configured for transmission as the MMS message.

19. The method of claim 1, wherein the break point identifiers comprise mark up language corresponding to a page group and mark up language corresponding to image objects, wherein the page group is treated as a graphics object, wherein the graphics object is at least one of a path object, a text object, an external object, an inline object, and a shading object.

20. The method of claim 19, wherein the portable document file analyzer treats text in the portable document file as text objects when identifying the at least one break point.

* * * * *